Figure 1:
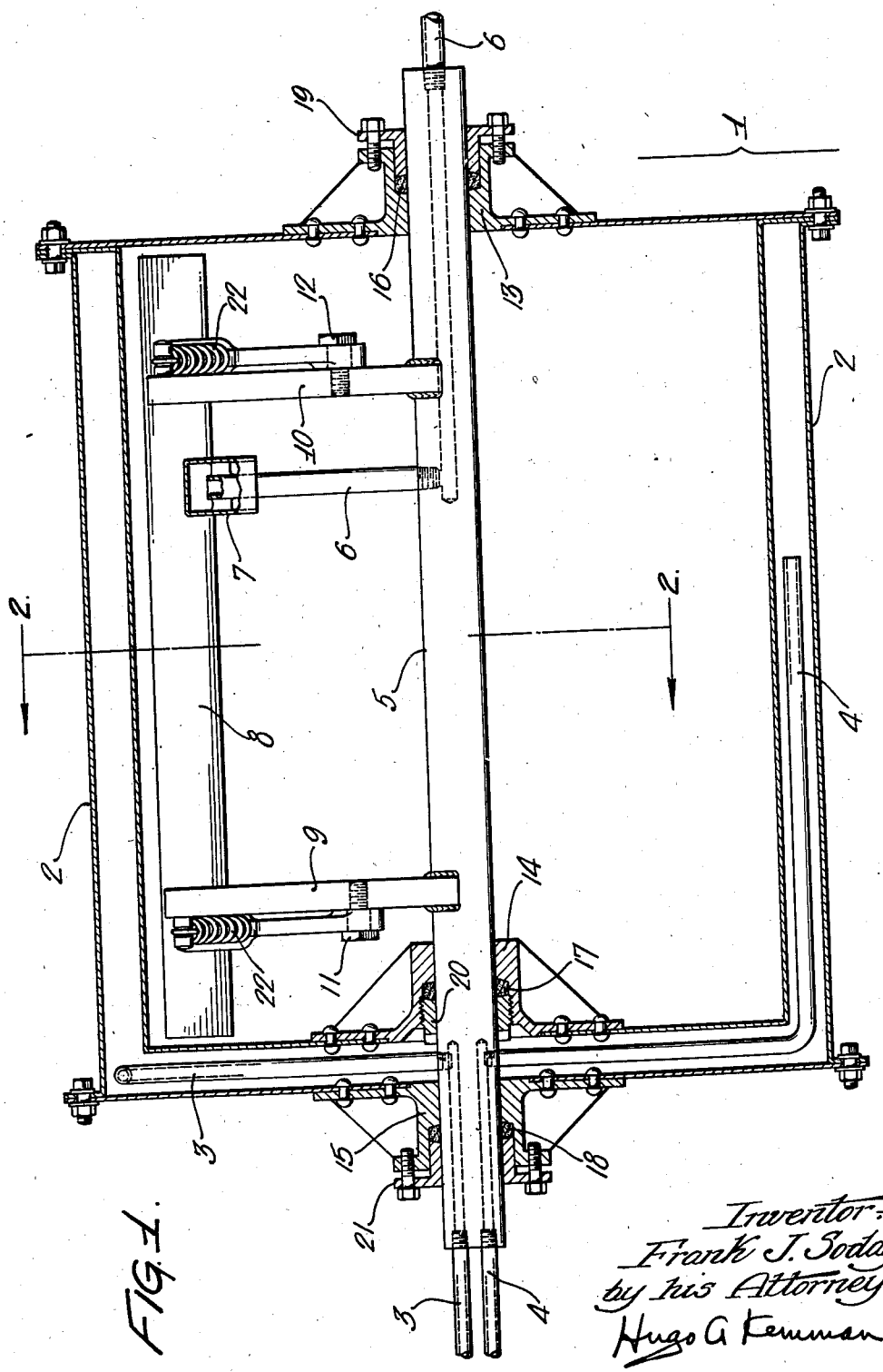

March 5, 1946.   F. J. SODAY   2,395,955
SEPARATION OF OLEFINS AND/OR DIOLEFINS FROM HYDROCARBON MIXTURES
Filed Oct. 3, 1942   3 Sheets-Sheet 3
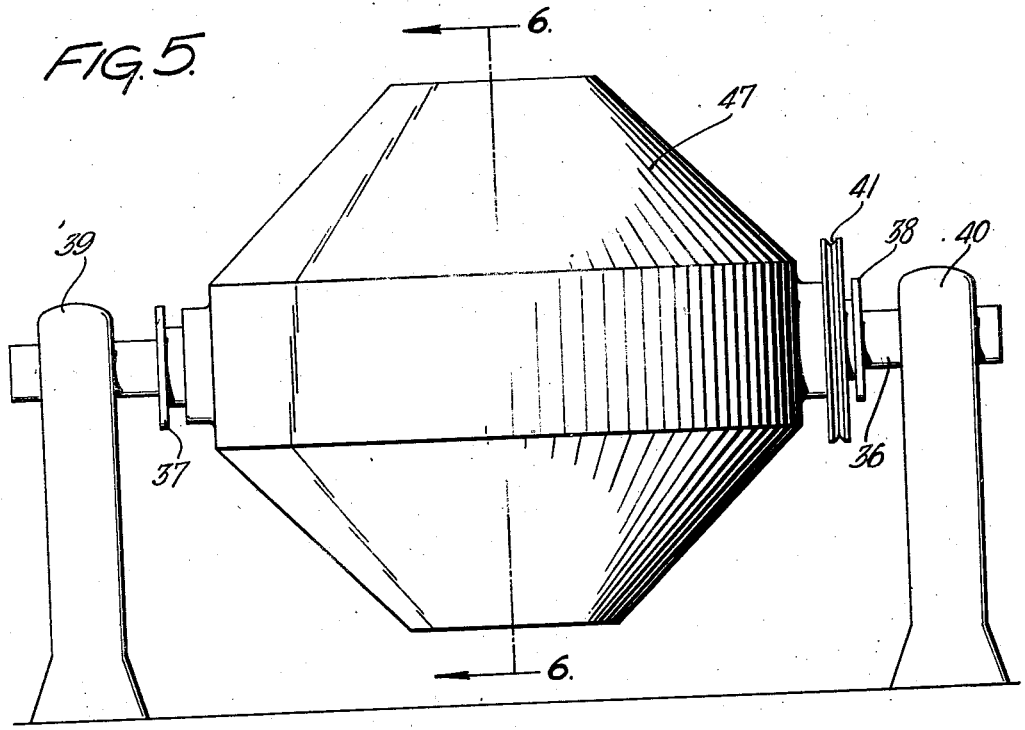
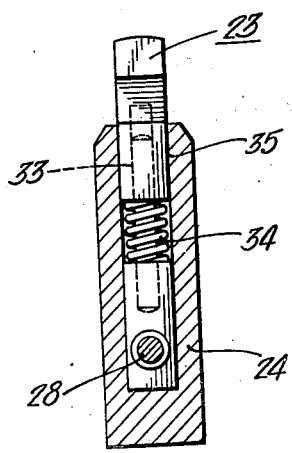
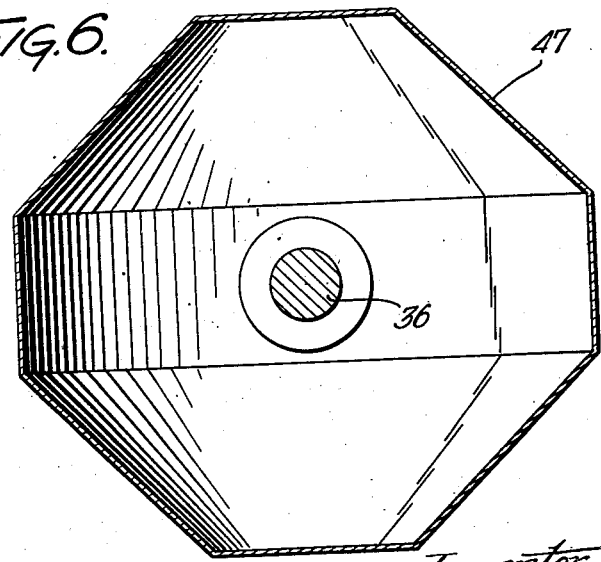
Inventor:
Frank J. Soday
by his Attorney
Hugo A Kemman Patented Mar. 5, 1946

2,395,955

UNITED STATES PATENT OFFICE 2,395,955

SEPARATION OF OLEFINS AND/OR DI-OLEFINS FROM HYDROCARBON MIXTURES

Frank J. Soday, Swarthmore, Pa., assignor to The United Gas Improvement Company, a corporation of Pennsylvania Application October 3, 1942, Serial No. 460,692

8 Claims. (Cl. 260—681.5)

This invention is concerned with the concentration of unsaturated hydrocarbons.

More particularly this invention pertains generally to the recovery of unsaturated hydrocarbons from liquids containing the same, and pertains particularly to such operations wherein solid dry salts of metals of groups IB and IIB of the periodic system are employed.

An object of the present invention is the provision of solid dry reagents of the type described in a more active form. Another object of the invention is the provision of methods whereby such reagents may be caused to retain their activity for unusually long periods of time. Other objects and advantages of the invention will be apparent to those skilled in the art upon an inspection of the specification and claims.

Solid dry salts of metals of groups IB and IIB of the periodic system and particularly monovalent salts of heavy metals of these groups, such as the halides, nitrates, sulfates, phosphates, formates, acetates, lactates, propionates, and carbonates of copper, mercury, and silver, may be employed for the recovery in more concentrated form from hydrocarbon mixtures, of diolefins and/or olefins by the formation of an association product, or a complex, of one or more of said unsaturated hydrocarbons with one or more of said salts under suitable temperature and pressure conditions, which complex or association product may be afterward dissociated, usually after separation from the unreacted material, to liberate the unsaturated hydrocarbon, or mixture of unsaturate hydrocarbons, and regenerate the reagent salt. Such dissociation or decomposition may be carried out by an increase in temperature and/or a reduction in pressure.

Monovalent cuprous salts are very desirable agents for use in concentrating processes of this type due to their stability, ease of regeneration, low cost, and availability. Cuprous chloride is a particularly desirable salt to be used for this purpose.

Under suitable conditions of temperature and pressure, diolefins may be made to react with reagents of the type described in preference to olefins. Furthermore, any two or more of these classes of hydrocarbons may be reacted with the dry reagent salt to form a plurality of association products which since they have different dissociation pressures, may be dissociated selectively, such as stagewise, to yield each particular class of hydrocarbon in more concentrated form.

Moreover, any of these classes of unsaturated hydrocarbons may be selectively removed from mixtures containing other materials.

Thus, the diolefins present in a given fraction may be contacted with my reaction mass under conditions of temperature and pressure such that substantially only diolefin materials are absorbed by the reaction mass. Then after removal of unreacted material, the complex formed between the diolefin material and the reaction mass may be decomposed by elevation in temperature and/or reduction in pressure to liberate the diolefin in concentrated form and revivify the reaction mass.

On the other hand, both olefins and diolefins may be absorbed simultaneously and separated from each other by regulation of temperature and/or pressure during dissociation as already referred to.

Processes of the general character to which reagent salts of the type more particularly described herein may be applied relate for the most part to the selective recovery of unsaturated hydrocarbons of less than seven carbon atoms, although they are not limited thereto.

Frequently, it is found to be technically advantageous to first resort to fractional distillation or other means to narrow the boiling range of the mixture.

Thus, a $C_5$ cut may be treated to concentrate the diolefins therein, or a fraction containing substantially no other diolefinic material than, say, isoprene and/or piperylene may be treated to more highly concentrate the diolefin material present and/or to separate the respective diolefins.

Likewise, a $C_4$ cut containing butadiene, butenes, and, perhaps, butanes may be treated to obtain a more highly concentrated butadiene fraction.

Such concentrated diolefin fractions may be treated with solid dry reagent salts of the type described herein to isolate the diolefinic material in more highly concentrated, or substantially pure form, or wider boiling fractions and/or less concentrated fractions may be employed for this purpose.

As described and claimed in my copending application, Serial No. 457,187 filed September 3, 1942, the efficiency of such solid dry reagent salts is increased substantially by the incorporation therein of a solid inorganic basic substance, such as an oxide, hydroxide, carbonate, or bicarbonate of an alkali metal and/or of an alkaline earth metal, in conjunction with an unsaturated hydrocarbon polymerization inhibitor, for example an amine type of inhibitor such as a secondary aryl amine; a phenolic type of inhibitor, for example, a polynuclear phenol, a polyhydroxy phenol, and/or a substituted phenolic material; and the reaction product of an aldehyde or a ketone with an amine.

I have discovered that such processes may be carried out in a particularly desirable manner when the dry reagent salt is maintained in an unusually fine state of subdivision.

Thus, exceptionally desirable results are obtained when at least the major portion of the dry reagent salt comprises particles having a diameter of less than 0.05 mm. and, more particularly, less than 0.03 mm. Even better results are obtained when at least the major portion of the dry reagent salt comprises particles having a diameter of less than 0.02 mm. and particularly less than 0.01 mm.

Although the benefits of this discovery may be realized in a number of ways, a particularly desirable method for insuring the production and maintenance of the dry reagent salt in the desired state of very fine subdivision comprises conducting the operations in a ball or rod mill provided with means to maintain a relatively clean surface on the mill at all times, such as by the use of a scraping agitator, a plow or other device; by the use of irregularly-shaped grinding objects; and/or by the use of a double conical ball mill.

Thus, when the concentration operations are carried out in the usual type of ball mill, consisting essentially of a revolving horizontal cylindrical vessel provided with a number of metallic balls or other objects designed to powder any friable material contained therein, the packing and agglomerizing tendencies of the dry reagent salts of the type described herein are such as to favor the formation of fairly large particles within the reagent mass, and to form a layer of the reagent salt on the inner surface of the ball mill. Both of these tendencies are favored by the presence in the reagent salt, particularly after at least one cycle of absorption-desorption operations, of small quantities of insoluble polymers derived from certain of the unsaturated hydrocarbons processed. Such insoluble polymers tend to cement together the particles of reagent, thus assisting in the agglomerizing process and in the formation of a layer of dry salt on the inner surface of the ball mill.

The formation of larger particles of reagent due to agglomerization largely reduces the efficiency of the system as only the reagent salt on the surface of such large particles is available for reaction. This is due presumably to the fact that the reagent salt largely increases in volume as the result of the formation of an association product or complex between an unsaturated hydrocarbon and the said reagent salt. This increase in volume serves to expand the outer surface of the agglomerized reagent particle, thus compacting it and sealing off the interior of the particle mass. As a result, the reagent particles in the interior of such large particles are not available for reaction.

The reagent layer adhering to the inner surface of the ball mill also is largely unavailable for reaction for the same reason. The reagent particles on the inner surface of such layer, that is the surface furthest removed from the surface of the ball mill, react with the unsaturated hydrocarbon to form an association product or complex. As a result of the substantial increase in volume involved, the surface of such layer compacts, effectively sealing off the layer and preventing the particles in the interior thereof from reacting.

In addition, the formation of this layer of reagent salt on the inner surface of the mill largely interferes with the operation of the unit by serving as an insulating layer, greatly retarding the transfer of heat from the wall of the mill to the bulk of the reagent mass contained therein. As the efficient operation of the process is dependent upon a rapid, uninterrupted flow of heat through the walls of the mill, such flow being inward during the heating cycle and outward during the cooling cycle, the effect of this insulating layer on the inner wall of the mill is such as to very seriously interfere with the economical and efficient operation of the unit.

As pointed out previously, the reagent salt may be reduced to, and maintained in, the desired degree of subdivision by the use of (1) irregularly shaped grinding and/or abrading objects in the mill in place of the spherical objects normally employed for this purpose, (2) the use of a scraper or plow designed to keep the inner surface of the mill free of deposits, and/or (3) the use of a double conical mill for this purpose.

The use of spherical objects, such as steel or other metallic balls, or flint pebbles, in the mill has been found to be inadequate to maintain the dry reagent salt in the desired state of very fine subdivision. Rather the dry reagent salt tends to agglomerize and to form a layer on the inner wall of the mill, thus reducing the efficiency of the system to a very marked degree.

I have discovered that this situation may be remedied, and the dry reagent salt reduced to, and maintained in the desired degree of subdivision by the use of irregularly shaped abrading objects, either alone or in conjunction with the spherical objects normally employed for this purpose in typical ball mill operations.

Such irregularly shaped objects are designed to scrape, rather than roll, over the inner surface of the mill, thus keeping it clean and preventing the formation of a layer of reagent salt thereon. With the walls of the mill clean at all times, thus eliminating any cushioning effect during the grinding operations, the formation of agglomerized particles in the interior of the reaction mass also is largely, if not entirely, prevented.

These irregularly shaped objects may have almost any desired form, such as oblong, pyramidal, hexagonal, octagonal, cylindrical, and the like. Particularly desirable types are objects having one dimension at least twice the magnitude of the other dimension, and preferably even more, such as rods or rod-shaped objects. The rods may be of any desired length, and may contain any number and type of projections along their long axis to serve as abraders to keep the inner surface of the mill clean.

It is to be understood, of course, that more than one type of irregularly shaped object may be employed simultaneously in the mill, and that such irregularly shaped objects may be used in conjunction with the usual type of spherical objects, such as metallic balls or flint pebbles.

Another method comprises the use of chains for this purpose, which may have any desired length. The chains may be attached to the inner wall of the mill, such as by welding at one or more points, if desired. The use of a number of chain lengths for this purpose provides a curtain effect which serves to maintain the reagent in the desired state of subdivision. Balls and/or other units may be used in conjunction with the use of the chains.

As in other methods described herein such arrangements are conducive to efficient heat transfer between the walls of the mill and the reagent therein which is a very important consideration.

Probably the most satisfactory method for maintaining the reagent salt in the desired state of very fine subdivision is the use of a scraping agitator or a plow on the inner wall of the mill. The scraping agitator may comprise a blade extending the entire length of the mill and mounted on a support by means of freely swinging pivots. By the use of suitable springs, the scraping blade may be urged against the inner wall of the mill with sufficient force to effectively remove any deposits of dry reagent salt thereon. Such scraper blade preferably is used in conjunction with spherical or non-spherical metallic, or other objects which serve to maintain the loosened mass in the desired very fine state of subdivision. In order not to interfere with the action of the balls or other abrading devices the scraper blade should be placed outside the zone of operation of such objects. As this includes the bottom of the mill and at least a portion of the side toward which the mill is rotating, the scraper blade, or blades, should be placed near, or at, the top of the mill, or at the opposite side of the mill, that is, at the clean side of the mill.

The use of more than one scraper blade will be found to be desirable in certain instances, and at least one of the blades may be provided with a serrated edge, or with teeth or other cutting units, to assist in breaking up the deposit of dry reagent salt on the inner surface of the mill.

An alternative method of operating the mill comprises maintaining the mill in a stationary position and rotating the scraper blade, or scraper blades, therein. In this method of operation, the scraper blades preferably are attached to a fairly broad support, or blade, which serves to revolve any balls, or other objects, contained in the mill to assist in pulverizing the reagent mass.

Figure 2:
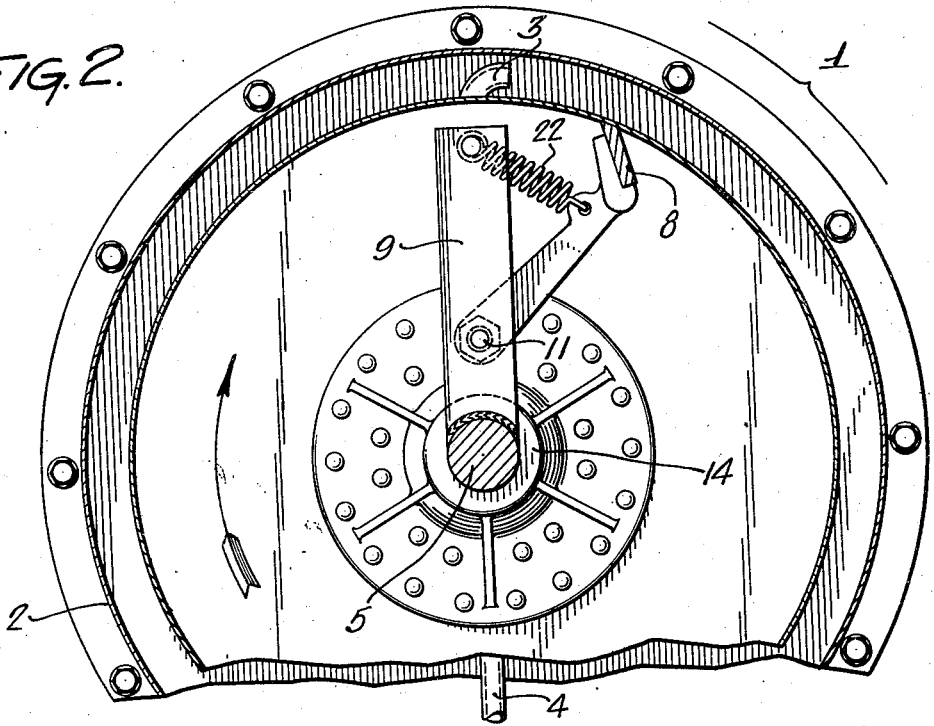

A suitable mill is shown in Figures 1 and 2. It comprises a horizontal, cylindrical shell 1 provided with a jacket 2 or other heating and/or cooling means. The jacket may be heated with steam, or other heating medium, which may be passed into the jacket by means of line 3, the condensate being removed by line 4. During the cooling cycle, water or other cooling agents may be passed through the jacket by means of the same lines.

The mill is supported by means of a trunion 5. This is partially hollowed to provide for the introduction of the heating and cooling lines 3 and 4, as well as the charging and discharge line 6 for the material undergoing treatment. The latter line may be provided with a hood 7 to prevent the entry of the reagent into the line, or with a filter or other suitable device for this purpose.

The trunnion also serves as a support for the plow 8, which is attached to the supporting members 9 and 10 by means of suitable swing joints 11 and 12, or by other suitable means.

The mill is supported by means of bearings 13, 14 and 15 through which the trunnion passes. Suitable packing strips 16, 17 and 18 held in place by means of packing glands 19, 20, 21 serves to effectively seal each bearing.

The unit shown preferably is rotated, the trunnion remaining stationary.

I shall now refer more particularly to Figure 2 which is a section taken on line 2—2 of Figure 1. The trunnion 5 serves as a point of attachment for the scraper supporting member 9, to which the scraper 8 is attached by means of a swing-joint 11 or other suitable device. The scraper blade is urged against the interior surface of the mill by springs 22 or other suitable means.

As pointed out previously, the mill may be provided with spherical, or other, balls or objects, rods, irregularly-shaped units and the like, to maintain the reagent in the desired state of very fine subdivision. The quantity used usually is preferably at least equal in weight to the weight of the reagent salt, and more preferably at least three times the weight of the reagent salt.

Fresh reagent may be charged to the unit and spent reagent removed therefrom by any suitable means, for example, by removing one or both ends, or by providing one or more manholes therein or otherwise.

In place of the scraper blade, or blades, a plow arrangement may be employed to remove any deposits from the inner surface of the mill. This plow, which may be of any suitable design and may possess a straight or serrated cutting edge, or be provided with teeth, prongs, or other cutting or digging devices, is suitably arranged to operate in a slot, depression, or track in a supporting member extending lengthwise of the mill, and is suitably urged against the inner surface of the mill to remove deposits of reagent salt formed thereon by means of a spring, or springs, which may be of the coil, leaf, or other desired type. The movement of the plow back and forth along the long axis of the mill, together with the circular motion of the mill, serves to effectively remove any deposits of reagent salts on the inner surface of the mill.

As in the case of the scraper previously described, the plow preferably is employed in conjunction with grinding or pulverizing agents, such as spherical balls and/or irregularly shaped metallic, or other, objects, which serve to maintain the reagent salt in a very fine state of subdivision. In such case, the plow and its supporting member preferably is located in such position as not to interfere with the grinding and pulverizing action of the balls, or other objects present.

A plurality of plows also may be employed, and such units may be affixed to one, or more than one, supporting member.

As in the case of the scraping agitator described previously, the plow and its supporting member may be revolved in a stationary mill, in which case the supporting member or supporting members preferably are of such design as to impart sufficient motion to the balls, or other pulverizing agents, present in the mill to maintain the reagent salt in the desired very finely divided state.

Figure 3:
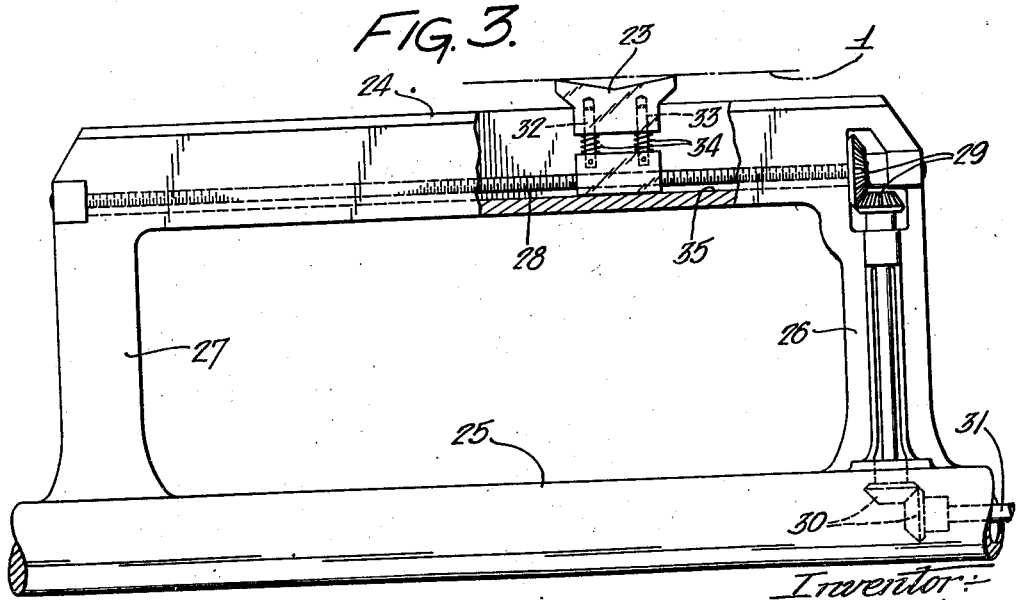

The design of a suitable plow is shown in Figures 3 and 4. The plow 23 operates in a slot in the supporting member 24, which in turn is attached to the trunnion 25 by means of supporting ribs 26 and 27. The plow is moved back and forth in the slot by means of a screw 28 or other suitable device. The screw, in turn, is actuated by means of gears as shown at 29 and 30, the impelling rod 31 passing through the axis of the trunnion and being connected to a source of power outside the ball mill.

The plow may be divided into two portions, the portions being maintained in their proper relationship by means of guide-pins 32 and 33. The plow may be urged against the inner wall of the mill by springs 34, or by other suitable means.

I shall refer now more particularly to Figure 4 which is an end view of the unit shown in Figure 3. The plow 23 moves in a slot 35 in the supporting member 24, and is actuated by means of screw 28. The plow is shown divided into two segments, suitably slidably connected by guide pins 32 and 33, only one of which is shown.

Finally, a double conical mill may be employed for reducing, and maintaining the reagent in the desired state of fineness. In this type of mill, the design is such as to impart both a sliding and rolling motion to the balls or other pulverizing agents employed therein, and to increase the effective pulverizing action of the said balls by causing the material to pour in a rolling stream into the lower cone at each half revolution, striking the wall of that cone, and curling upward and over toward the center, each particle taking a different course because of the cone surface. The apices of the truncated cones are perpendicular to the axis of rotation. This increases the effective velocity of the balls, and hence their grinding and pulverizing action. The use of non-spherical objects, either alone or in conjunction with spherical balls and/or pebbles, and/or possibly the use of a scraping agitator and/or a plow, in a double conical mill will be found to give excellent results.

A schematic drawing of a unit of this type is shown in Figures 5 and 6. The double-conical mill 47 is supported by means of a trunnion 36 connected to the mill by means of suitable stuffing boxes 37 and 38. The trunnion in turn is attached to suitable supports 39 and 40. The mill is powered by means of a pulley 41, or other suitable means. The mill preferably is rotated about a stationary trunnion.

Figure 6 is a section taken on line 6—6 of Figure 5.

Means for heating and cooling the jacket as well as to introduce the charge stock and remove the products, may be provided as shown in Figure 1 or otherwise for example by providing a manhole for introducing fresh and removing spent reagent.

It is to be understood that any of the foregoing methods for reducing and maintaining the reagent salt in the desired very finely divided state may be used alone, or in any desired combination.

The concentrating process employing very finely divided reagent salts of the type described herein is particularly applicable for use in the concentration of butadiene, isoprene, and piperylene from hydrocarbon fractions containing the same.

The process is more particularly illustrated by means of the following examples:

Example 1

A mixture of 95 parts of anhydrous cuprous chloride, which had been reduced in size previously until the average particle size was less than 0.045 mm., 4 parts of calcium oxide, and 1 part of phenyl-beta-naphthylamine was placed in a standard ball mill provided with steel balls, after which a 50% butadiene fraction was introduced and absorbed during a period of 20 minutes at 0° C. Upon raising the temperature to 25° C., an olefin cut containing only 4% butadiene was obtained. The temperature was increased to 50° C., during which time a small quantity of recycle stock containing approximately 50% butadiene was obtained.

Finally, upon heating to temperatures of 60° C., and above, 75% of the butadiene present in the original charge stock was isolated in the form of a 98% product.

Upon repeating the operation with the same reagent salt, the olefin fraction obtained contained 15% butadiene. The recycle stock, containing approximately 50% butadiene, was obtained in larger quantities than in the first experiment, while the quantity of product butadiene (98%) obtained was sharply reduced.

The operation again was repeated with the same reagent salt. The olefin fraction obtained contained 25% butadiene, the recycle stock was obtained in larger amounts, and practically no product butadiene (98%) was obtained.

Upon opening the ball mill at the close of this third absorption-desorption cycle, it was found that the reagent had largely agglomerized to form fairly large particles, and the inner surface of the mill was coated with a continuous layer of reagent salt approximately ⅛" thick.

Example 2

The ball mill used in Example 1 was fitted with two scraping agitator blades affixed to movable pinions and urged to the side of the autoclave by means of coil springs. A number of spherical balls were placed in the mill, after which the same reagent employed in Example 1 was added.

Upon concentrating the same 50% light oil butadiene fraction in the unit, an olefin fraction containing 4% butadiene, a recycle stock containing 50% butadiene, and a product butadiene (98%) fraction were obtained. Approximately 79% of the total butadiene charged to the unit was isolated as product butadiene.

A total of 114 consecutive concentrating operations then were carried out with the same reagent without removing it from the mill. Essentially the same results were obtained throughout, the olefin fraction containing only small quantities of butadiene and excellent yields of product butadiene being obtained.

At the end of this cycle of operations, the reagent was removed from the mill and examined. The diameter of the majority of the particles present was of the order of 0.002–0.01 mm., indicating a further substantial reduction in size during this series of concentrating operations.

Example 3

A mixture of very finely powdered cuprous chloride (96 parts), the major portion of the particles being 0.05 mm., or smaller, in diameter, calcium oxide (3 parts), and p-tertiary butyl catechol (1 part) was placed in the mill described in Example 2. A 70% isoprene fraction containing 25% amylenes and 5% pentanes was reacted with this reagent for a period of 30 minutes at a temperature of 0° C.

The temperature of the reaction mixture then was increased to 25° C., under reduced pressure, resulting in the removal of the major portion of the amylenes and pentanes present. Upon heating to a temperature of 50° C., a small quantity of recycle stock was secured.

The temperature then was increased to 80° C., whereupon approximately 80% of the isoprene present in the original charge was isolated in the form of a 98% product.

Upon removing the reagent from the mill, the major portion of the particles present were found to have a diameter of less than 0.036 mm., indicating a substantial reduction in size during the concentration operations.

*Example 4*

A 75% light oil piperylene fraction was concentrated in a manner similar to that described in Example 3 with the exception that the reagent consisted of 95 parts of cuprous chloride having an average particle size of less than 0.05 mm., 4 parts of calcium oxide, and 1 part of the reaction product of acetone and aniline.

Approximately 80% of the piperylene present in the charge was isolated in the form of a 98% product.

Upon removing the reagent from the mill the size of the majority of the reagent particles was found to be less than 0.02 mm. in diameter.

In the specification and the claims, the following terms have the indicated meanings.

The term "polymerization inhibitor" is intended to include those substances commonly designated as inhibitors and/or antioxidants, and which act to prevent, or retard the rate of, the polymerization of unsaturated hydrocarbons.

The term "inorganic basic substance" is intended to define one or more inorganic materials capable of reacting with and neutralizing an acid or an acidic material.

With respect to a measure of the fineness of the reagent salt it will be readily appreciated that a few relatively large clumps which may be present without greatly reducing the efficiency of the process, will nevertheless raise the average particle diameter to a considerable extent. Therefore, as a measure of fineness of the reagent salt, I may say that I prefer to have at least 85% of such particles of a diameter less than 0.05 mm. which in the case of non-spherical particles is the longer axis and more particularly prefer to have at least 95% of such particles of a diameter less than 0.05 mm. The same percentages also apply to the more preferred smaller diameters disclosed herein.

An outstanding feature of my invention is that it is preferably carried out in a substantially non-aqueous system, or in other words in the substantial absence of water. Since in industrial processes of this general character the presence of some moisture is unavoidable, such moisture preferably should not be permitted to accumulate in quantities greater than 2% by weight of solid dry salt and more preferably not greater than 1% by weight of said salt. Substantially lower tolerances are recommended.

Conceivably larger quantities of water may be present with the realization of some of the advantages of my invention but with a sacrifice of others.

While various procedures have been particularly described these are of course subject to considerable variation. Therefore, it will be understood that the foregoing specific examples are given by way of illustration and that changes, omissions, substitutions, and/or modifications might be made within the scope of the claims without departing from the spirit of the invention, which is intended to be limited only as required by the prior art.

I claim:

1. In a cyclic process for separating in more concentrated form an unsaturated hydrocarbon selected from the group consisting of olefins and diolefins from a hydrocarbon mixture containing said unsaturated hydrocarbon to be separated and hydrocarbon material of lesser unsaturation than said unsaturated hydrocarbon to be separated, in which cycle said mixture in liquid phase is contacted with a finely divided solid dry monovalent salt of a metal selected from the group consisting of copper, mercury and silver, said contact taking place in a substantially non-aqueous system and under conditions of temperature and pressure such as to form an association product of said salt and said unsaturated hydrocarbon to be separated, in which cycle hydrocarbon material of lesser unsaturation is thereafter removed from said association product, and in which cycle said association product is thereafter dissociated to recover said unsaturated hydrocarbon in more concentrated form and to regenerate said salt for use in a subsequent cycle with another charge of said hydrocarbon mixture in liquid phase, the improvement which comprises pulverizing substantially all of said salt in both its non-associated and associated forms to such extent during each cycle of a series of cycles so as to maintain throughout each of said cycles at least 85% thereof in the form of particles any axis of which is less than 0.05 mm. in length.

2. In a cyclic process for separating diolefin material in more concentrated form from a hydrocarbon mixture containing said diolefin material and olefin material, in which cycle said mixture in liquid phase is contacted with a finely divided solid dry monovalent salt of a metal selected from the group consisting of copper, mercury and silver, said contact taking place in a substantially non-aqueous system and under conditions of temperature and pressure such as to form an association product of said salt and said diolefin material, in which cycle olefin material is thereafter removed from said association product, and in which cycle said association product is thereafter dissociated to recover said diolefin material in more concentrated form and to regenerate said salt for use in a subsequent cycle with another charge of said hydrocarbon mixture in liquid phase, the improvement which comprises pulverizing substantially all of said salt in both its non-associated and associated forms to such extent during each cycle of a series of cycles so as to maintain throughout each of said cycles at least 85% thereof in the form of particles any axis of which is less than 0.05 mm. in length.

3. In a cyclic process for separating diolefin material in more concentrated form from a hydrocarbon mixture containing said diolefin material and olefin material, in which cycle said mixture in liquid phase is contacted with a finely divided solid dry monovalent salt of a metal selected from the group consisting of copper, mercury and silver, said contact taking place in a substantially non-aqueous system and under conditions of temperature and pressure such as to form an association product of said salt and said diolefin material, in which cycle olefin material is thereafter removed from said association product, and in which cycle said association product is thereafter dissociated to recover said diolefin material in more concentrated form and to regenerate said salt for use in a subsequent cycle with another charge of said hydrocarbon mixture in liquid phase, the improvement which comprises employing said salt in the form of a finely divided intermixture with a solid inorganic basic substance and an inhibitor capable of inhibiting the polymerization of unsaturated hydrocarbons in said hydrocarbon mixture, and pulverizing substantially all of said salt in both its non-associated and associated forms to such extent during each cycle of a series of cycles so as to maintain throughout each of said cycles at least 85% thereof in the form of particles any axis of which is less than 0.05 mm. in length.

4. In a cyclic process for separating diolefin material in more concentrated form from a hydrocarbon mixture containing said diolefin material and olefin material, in which cycle said mixture in liquid phase is contacted with finely divided solid dry cuprous chloride, said contact taking place in a substantially non-aqueous system and under conditions of temperature and pressure such as to form an association product of said cuprous chloride and said diolefin material, in which cycle olefin material is thereafter removed from said association product, and in which cycle said association product is thereafter dissociated to recover said diolefin material in more concentrated form and to regenerate said cuprous chloride for use in a subsequent cycle with another charge of said hydrocarbon mixture in liquid phase, the improvement which comprises employing said cuprous chloride in the form of a finely divided intermixture with a solid alkaline earth oxide and an inhibitor capable of inhibiting the polymerization of unsaturated hydrocarbons in said hydrocarbon mixture, and pulverizing substantially all of said cuprous chloride in both its non-associated and associated forms to such extent during each cycle of a series of cycles so as to maintain throughout each of said cycles at least 85% thereof in the form of particles any axis of which is less than 0.05 mm. in length.

5. In a cyclic process for separating diolefin material of less than 7 carbon atoms per molecule in more concentrated form from a hydrocarbon mixture containing said diolefin material and olefin material of less than 7 carbon atoms per molecule, in which cycle said mixture in liquid phase is contacted with finely divided solid dry cuprous chloride, said contact taking place in a substantially non-aqueous system and under conditions of temperature and pressure such as to form an association product of said cuprous chloride and said diolefin material, in which cycle olefin material is thereafter removed from said association product, and in which cycle said association product is thereafter dissociated to recover said diolefin material in more concentrated form and to regenerate said cuprous chloride for use in a subsequent cycle with another charge of said hydrocarbon mixture in liquid phase, the improvement which comprises pulverizing substantially all of said cuprous chloride in both its non-associated and associated forms to such extent during each cycle of a series of cycles so as to maintain throughout each of said cycles at least 85% thereof in the form of particles any axis of which is less than 0.05 mm. in length.

6. In a cyclic process for separating butadiene in more concentrated form from a hydrocarbon mixture containing butadiene and olefin material, in which cycle said mixture in liquid phase is contacted with finely divided solid dry cuprous chloride, said contact taking place in a substantially non-aqueous system and under conditions of temperature and pressure such as to form an association product of said cuprous chloride and said butadiene, in which cycle olefin material is thereafter removed from said association product, and in which cycle said association product is thereafter dissociated to recover said butadiene in more concentrated form and to regenerate said cuprous chloride for use in a subsequent cycle with another charge of said hydrocarbon mixture in liquid phase, the improvement which comprises employing said cuprous chloride in the form of a finely divided intermixture with solid calcium oxide and an inhibitor capable of inhibiting the polymerization of unsaturated hydrocarbons in said hydrocarbon mixture, and pulverizing substantially all of said cuprous chloride in both its non-associated and associated forms to such extent during each cycle of a series of cycles so as to maintain throughout each of said cycles at least 85% thereof in the form of particles any axis of which is less than 0.05 mm. in length.

7. In a cyclic process for separating isoprene in more concentrated form from a hydrocarbon mixture containing isoprene and olefin material, in which cycle said mixture in liquid phase is contacted with finely divided solid dry cuprous chloride, said contact taking place in a substantially non-acqeous system and under conditions of temperature and pressure such as to form an association product of said cuprous chloride and said isoprene, in which cycle olefin material is thereafter removed from said association product, and in which cycle said association product is thereafter dissociated to recover said isoprene in more concentrated form and to regenerate said cuprous chloride for use in a subsequent cycle with another charge of said hydrocarbon mixture in liquid phase, the improvement which comprises employing said cuprous chloride in the form of a finely divided intermixture with solid calcium oxide and an inhibitor capable of inhibiting the polymerization of unsaturated hydrocarbons in said hydrocarbon mixture, and pulverizing substantially all of said cuprous chloride in both its non-associated and associated forms to such extent during each cycle of a series of cycles so as to maintain throughout each of said cycles at least 85% thereof in the form of particles any axis of which is less than 0.05 mm. in length.

8. In a cyclic process for separating piperylene in more concentrated form from a hydrocarbon mixture containing piperylene and olefin material, in which cycle said mixture in liquid phase is contacted with finely divided solid dry cuprous chloride, said contact taking place in a substantially non-acqueous system and under conditions of temperature and pressure such as to form an association product of said cuprous chloride and said piperylene, in which cycle olefin material is thereafter removed from said association product, and in which cycle said association product is thereafter dissociated to recover said piperylene in more concentrated form and to regenerate said cuprous chloride for use in a subsequent cycle with another charge of said hydrocarbon mixture in liquid phase, the improvement which comprises employing said cuprous chloride in the form of a finely divided intermixture with solid calcium oxide and an inhibitor capable of inhibiting the polymerization of unsaturated hydrocarbons in said hydrocarbon mixture, and pulverizing substantially all of said cuprous chloride in both its non- associated and associated forms to such extent during each cycle of a series of cycles so as to maintain throughout each of said cycles at least 85% thereof in the form of particles any axis of which is less than 0.05 mm. in length.

FRANK J. SODAY.